(12) United States Patent
Chen et al.

(10) Patent No.: US 9,194,973 B2
(45) Date of Patent: Nov. 24, 2015

(54) SELF ADAPTIVE TWO DIMENSIONAL FILTER FOR DISTRIBUTED SENSING DATA

(75) Inventors: Jianfeng Chen, Pearland, TX (US); Xudong Yang, Katy, TX (US)

(73) Assignee: Baker Hughes Incorporated, Houston, TX (US)

( * ) Notice: Subject to any disclaimer, the term of this patent is extended or adjusted under 35 U.S.C. 154(b) by 1301 days.

(21) Appl. No.: 12/959,819

(22) Filed: Dec. 3, 2010

(65) Prior Publication Data

US 2012/0139746 A1  Jun. 7, 2012

(51) Int. Cl.
| | | |
|---|---|---|
| *G06F 19/00* | (2011.01) |
| *G01V 3/38* | (2006.01) |
| *E21B 47/06* | (2012.01) |
| *E21B 47/12* | (2012.01) |
| *E21B 49/00* | (2006.01) |

(52) U.S. Cl.
CPC . *G01V 3/38* (2013.01); *E21B 47/06* (2013.01); *E21B 47/065* (2013.01); *E21B 47/123* (2013.01); *E21B 49/006* (2013.01)

(58) Field of Classification Search
CPC . E21B 47/065; E21B 47/0006; E21B 47/123; E21B 49/006; G02B 6/0208
USPC ........................... 73/760; 702/6, 41–43, 190; 374/136–137
See application file for complete search history.

(56) References Cited

U.S. PATENT DOCUMENTS

| | | | |
|---|---|---|---|
| 4,030,064 A | 6/1977 | Elliott |
| 4,859,844 A | 8/1989 | Herman et al. |
| 5,050,089 A | 9/1991 | Stelson et al. |
| 5,401,956 A | 3/1995 | Dunphy et al. |
| 5,440,310 A | 8/1995 | Schreiner |
| 5,481,922 A | 1/1996 | Washabaugh |
| 5,625,724 A | 4/1997 | Frederick et al. |
| 5,675,674 A | 10/1997 | Weis |
| 5,869,835 A | 2/1999 | Udd |
| 5,892,860 A | 4/1999 | Maron et al. |
| 5,963,321 A | 10/1999 | Wang |
| 6,016,702 A | 1/2000 | Maron |

(Continued)

FOREIGN PATENT DOCUMENTS

| | | |
|---|---|---|
| DE | 19913113 A1 | 10/2000 |
| EP | 0892244 A2 | 1/1999 |

(Continued)

OTHER PUBLICATIONS

Rambow et al., "Real-Time Fiber-Optic Casing Imager", Nov. 11-14, 2007, SPE Annual Technical Conference and Exhibition.*

(Continued)

*Primary Examiner* — John H Le
(74) *Attorney, Agent, or Firm* — Cantor Colburn LLP

(57) ABSTRACT

A method, apparatus and computer-readable medium for filtering a signal from a plurality of distributed sensors is disclosed. The signal is obtained from the plurality of distributed strain sensors. A first subspace of a measurement space of the obtained signal is selected, wherein the first subspace is characterized by a step having a selected step size. An error for a filter corresponding to the first subspace is estimated and the step size is adjusted when the estimated error meets a selected criterion. A second subspace characterized by a step having the adjusted step size is selected and the signal is filtered by applying a filter corresponding to the second subspace.

21 Claims, 6 Drawing Sheets

(56) References Cited

U.S. PATENT DOCUMENTS

| | | | |
|---|---|---|---|
| 6,069,686 A | 5/2000 | Wang et al. | |
| 6,072,567 A * | 6/2000 | Sapack | 356/32 |
| 6,233,746 B1 | 5/2001 | Skinner | |
| 6,252,656 B1 | 6/2001 | Wu et al. | |
| 6,256,090 B1 | 7/2001 | Chen et al. | |
| 6,285,446 B1 | 9/2001 | Farhadiroushan | |
| 6,314,214 B1 | 11/2001 | Walter et al. | |
| 6,346,702 B1 | 2/2002 | Davis et al. | |
| 6,370,406 B1 | 4/2002 | Wach et al. | |
| 6,487,349 B2 | 11/2002 | Wach et al. | |
| 6,501,067 B2 | 12/2002 | Jones et al. | |
| 6,545,760 B1 | 4/2003 | Froggatt et al. | |
| 6,611,633 B1 | 8/2003 | Vohra et al. | |
| 6,640,647 B1 | 11/2003 | Hong et al. | |
| 6,753,791 B2 | 6/2004 | Wei et al. | |
| 7,028,543 B2 | 4/2006 | Hardage et al. | |
| 7,245,791 B2 | 7/2007 | Rambow et al. | |
| 7,327,907 B2 | 2/2008 | Shaibani et al. | |
| 7,424,186 B2 | 9/2008 | Arab-Sadeghabadi et al. | |
| 7,769,252 B2 | 8/2010 | Taverner et al. | |
| 7,946,341 B2 | 5/2011 | Hartog et al. | |
| 2001/0021843 A1 | 9/2001 | Bosselmann et al. | |
| 2002/0075114 A1 | 6/2002 | Hall et al. | |
| 2003/0217605 A1 | 11/2003 | Croteau et al. | |
| 2003/0219147 A1 | 11/2003 | Nishiura | |
| 2004/0028311 A1 | 2/2004 | Moslehi et al. | |
| 2004/0065439 A1 | 4/2004 | Tubel et al. | |
| 2004/0083808 A1 | 5/2004 | Rambow et al. | |
| 2004/0099420 A1 | 5/2004 | Kotrla et al. | |
| 2004/0184700 A1 | 9/2004 | Li et al. | |
| 2005/0149264 A1 * | 7/2005 | Tarvin et al. | 702/6 |
| 2005/0167094 A1 | 8/2005 | Streich et al. | |
| 2006/0120675 A1 | 6/2006 | Goldner et al. | |
| 2006/0225881 A1 * | 10/2006 | O'Shaughnessy et al. | 166/250.17 |
| 2006/0233482 A1 | 10/2006 | Rambow | |
| 2007/0051882 A1 | 3/2007 | Childers | |
| 2007/0065077 A1 | 3/2007 | Childers et al. | |
| 2007/0126594 A1 | 6/2007 | Atkinson et al. | |
| 2007/0156019 A1 | 7/2007 | Larkin et al. | |
| 2007/0251326 A1 | 11/2007 | Mathis | |
| 2007/0253144 A1 | 11/2007 | Kuwajima | |
| 2007/0289741 A1 * | 12/2007 | Rambow | 166/250.01 |
| 2008/0047662 A1 | 2/2008 | Dria et al. | |
| 2008/0210725 A1 | 9/2008 | Birtwisle et al. | |
| 2009/0063087 A1 | 3/2009 | Grichnik et al. | |
| 2009/0085710 A1 | 4/2009 | Meinke | |
| 2009/0097015 A1 | 4/2009 | Davies et al. | |
| 2009/0254280 A1 * | 10/2009 | Stoesz | 702/6 |
| 2010/0051347 A1 | 3/2010 | Tchakarov et al. | |
| 2010/0219334 A1 | 9/2010 | Legrand et al. | |
| 2010/0303426 A1 | 12/2010 | Davis | |
| 2011/0054808 A1 | 3/2011 | Pearce et al. | |
| 2011/0113852 A1 | 5/2011 | Prisco | |
| 2012/0132417 A1 | 5/2012 | Dria et al. | |
| 2012/0143522 A1 | 6/2012 | Chen et al. | |
| 2012/0143523 A1 | 6/2012 | Chen et al. | |
| 2012/0143524 A1 | 6/2012 | Chen et al. | |
| 2012/0143525 A1 | 6/2012 | Chen et al. | |

FOREIGN PATENT DOCUMENTS

| | | |
|---|---|---|
| GB | 2368921 A | 5/2002 |
| GB | 2397885 A | 8/2004 |
| GB | 2411956 A | 9/2005 |
| GB | 2433112 A | 6/2007 |
| JP | 3252501 A | 11/1991 |
| JP | 2002107122 A | 4/2002 |
| JP | 2003294851 A | 10/2003 |
| WO | WO0012978 | 3/2000 |
| WO | WO03014657 A1 | 2/2003 |
| WO | WO03050376 A2 | 6/2003 |
| WO | WO2006113327 A1 | 10/2006 |
| WO | WO2006123068 A1 | 11/2006 |

OTHER PUBLICATIONS

International Search Report and the Written Opinion of the International Searching Authority, or the Declaration for International Application No. PCT/US2011/059116, all references cited above.

International Search Report and Written Opinion dated Jun. 28, 2012 for International Application No. PCT/US2011/059130.

International Search Report and Written Opinion dated Jun. 29, 2012 for International Application No. PCT/US2011/059119.

International Search Report and Written Opinion dated Jun. 29, 2012 for International Application No. PCT/US2011/059124.

International Search Report and Wrotten Opinion dated Jun. 28, 2012 for International Application No. PCT/US2011/059122.

Barak, Phillip; "Smoothing and Differentiation by an Adaptive-Degree Polynomial Filter," Analytical Chemistry, vol. 67, No. 17, Sep. 1, 1995, pp. 2758-2762.

Browne, M., et al.; "A multiscale polynomial filter for adaptive smoothing," Digital Signal Processing 17, (2007), pp. 69-75.

Hayes, Monson H.; "Recursive Least Squares, 9.4," Statistical Digital Signal Processing and Modeling, 1996, pp. 541-553.

Savitzky, A. et al.; "Smoothing and Differentiation of Data by Simplified Least Squares Procedures," Analytical Chemistry, vol. 36, No. 8, Jul. 1964, pp. 1627-1639.

Timoshenko, S.; "Analysis of Bi-Metal Thermostats," J.O.S.A. & R.S.I., Sep. 11, 1925, pp. 233-255.

* cited by examiner

US 9,194,973 B2

SELF ADAPTIVE TWO DIMENSIONAL FILTER FOR DISTRIBUTED SENSING DATA

CROSS REFERENCE TO RELATED APPLICATIONS

The present application is related to U.S. patent application Ser. No. 12/960,140, filed Dec. 3, 2010, U.S. patent application Ser. No. 12/959,862, filed Dec. 3, 2010, U.S. patent application Ser. No. 12/960,119, filed Dec. 3, 2010, U.S. patent application Ser. No. 12/959,764, filed Dec. 3, 2010, and U.S. patent application Ser. No. 12/959,781, filed Dec. 3, 2010, the contents of which are hereby incorporated herein by reference in their entirety.

BACKGROUND OF THE DISCLOSURE

1. Field of the Disclosure

The present application is related to methods for reducing noise in distributed sensing data obtained from a real-time downhole monitoring system.

2. Description of the Related Art

Tubulars are used in many stages of oil exploration and production, such as drilling operations, well completions and wireline logging operations. Due to their exposure to various stresses found downhole, various measurements are typically obtained to determine the strains on these tubulars and other parameters as well. These measurements generally include signals that have a noise component. The present disclosure provides a method of filtering a signal to reduce noise.

SUMMARY OF THE DISCLOSURE

In one aspect, the present disclosure provides method of filtering a signal from a plurality of distributed sensors, the method including: obtaining the signal from the plurality of distributed strain sensors; selecting a first subspace of a measurement space of the obtained signal, the first subspace characterized by a step having a selected step size; estimating an error for a filter corresponding to the first subspace; adjusting the step size when the estimated error meets a selected criterion; selecting a second subspace characterized by a step having the adjusted step size; and filtering the signal by applying a filter corresponding to the second subspace.

In another aspect, the present disclosure provides an apparatus for filtering a signal obtained at a member, the apparatus including: a plurality of sensors distributed on the member configured to obtain the signal from the member; and a processor configured to: obtain the signal from the plurality of distributed strain sensors; select a first subspace of a measurement space of the obtained signal, the first subspace characterized by step having a selected step size; estimate an error for a filter corresponding to the first subspace; adjust the step size when the estimated error meets a selected criterion; select a second subspace characterized by a step having the adjusted step size; and filter the signal by applying a filter corresponding to the second subspace.

In yet another aspect, the present disclosure provides a computer readable medium having stored thereon instructions that when read by a processor enable the processor to perform a method, the method comprising: obtaining the signal from the plurality of distributed strain sensors; selecting a first subspace of a measurement space of the obtained signal, the first subspace characterized by a step having a selected step size; estimating an error for a filter corresponding to the first subspace; adjusting the step size when the estimated error meets a selected criterion; selecting a second subspace characterized by a step having the adjusted step size; and filtering the signal by applying a filter corresponding to the second subspace.

Examples of certain features of the apparatus and method disclosed herein are summarized rather broadly in order that the detailed description thereof that follows may be better understood. There are, of course, additional features of the apparatus and method disclosed hereinafter that will form the subject of the claims.

BRIEF DESCRIPTION OF THE DRAWINGS

The present disclosure is best understood with reference to the accompanying figures in which like numerals refer to like elements and in which.

DETAILED DESCRIPTION OF THE DISCLOSURE

Figure 1:
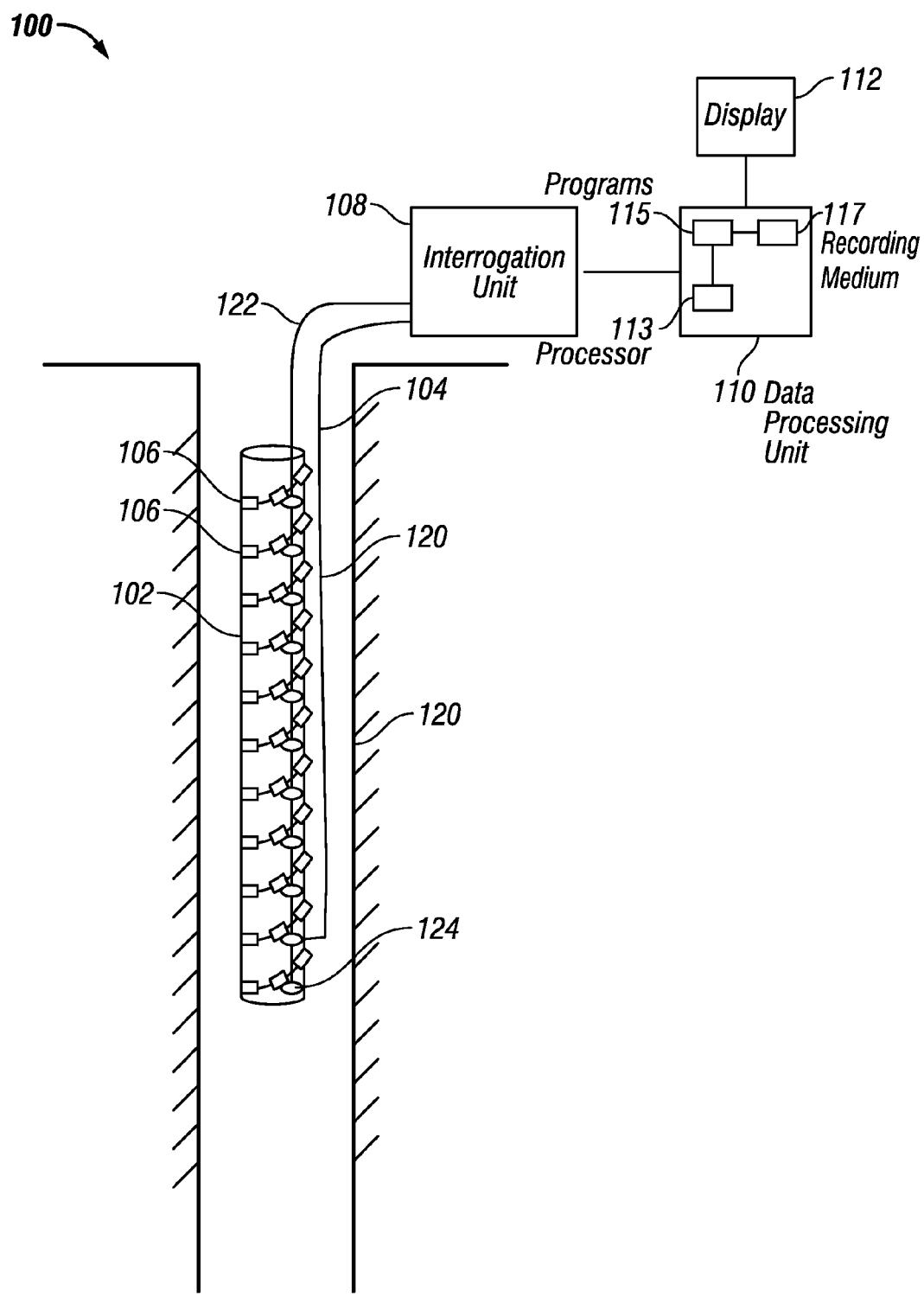
FIG. 1 illustrates an exemplary system for obtaining a signal at a tubular deployed in a wellbore.

FIG. 1 shows an exemplary embodiment of a system 100 for determining a deformation of a tubular 102 disposed in a wellbore 120. The tubular may be any tubular typically used in a wellbore, such as a well casing or a drilling tubular, for example. In addition, the present disclosure is not limited to a tubular in a wellbore and may also be used on any exemplary member such as a casing, a sand screen, a subsea riser, an umbilical, a tubing, a pipeline, a cylindrical structure bearing a load and so forth. The exemplary member may undergo a variety of deformations. The exemplary member includes a plurality of sensors at various locations on the member. Each of the plurality of sensors obtains a measurement related to strain at the related location on the tubular. In various embodiments, the plurality of sensors may be Bragg grating sensors, Brillouin fiber optic sensors, electrical strain sensors, sensors along a fiber optic cable, or any other device suitable for obtaining a strain measurement. In alternate embodiments, the obtained measurements related to strain may include, for example, a measurement of wavelength shift, a measurement of frequency change, and/or a measurement of a change in impedance. For the purposes of illustration, the member of the exemplary embodiment disclosed herein includes a tubular 102 in a wellbore and the sensors 106 are Fiber-Bragg gratings along a fiber optic cable 104 helically wrapped around a surface of the tubular 102.

The exemplary embodiment of FIG. 1 shows a system for obtaining a signal at the tubular that includes a fiber optic cable 104 having a plurality of sensors 106, each sensor obtaining a strain at a location of the tubular. In one aspect, the sensors for obtaining a strain may be a sensor for obtaining a wavelength signal related to the strain, such as a Fiber Bragg Grating (FBG). Each sensor or FBG is assigned a number (grating number) indicating its position along the fiber optic cable 104. An end of the fiber optic cable 104 is coupled to an interrogation unit 108 typically at a surface location that in one aspect obtains a measurement from each of the FBGs to determine a wavelength shift or strain at each of the FBGs. In general, the interrogation unit 108 reads the plurality of gratings simultaneously using, for example, frequency divisional multiplexing. Interrogation unit 108 is coupled to a data processing unit 110 and in one aspect transmits the measured wavelength shifts to the data processing unit. In one aspect, the data processing unit 110 receives and processes the measured wavelength shifts from the interrogation unit 108 to obtain a result, such as a three-dimensional image of a tubular deformation. A typical data processing unit 110 includes a computer or processor 113 for performing the exemplary methods disclosed herein, at least one memory 115 for storing programs and data, and a recording medium 117 for recording and storing data and results obtained using the exemplary methods disclosed herein. The data processing unit 110 may output the result to various devices, such as display 112 or to the suitable recording medium 117.

A Fiber Bragg Grating such as FBG 106 typically operates by reflecting light of a selected wavelength. A Fiber Bragg Grating is typically a section of an optical fiber in which the refractive index has been altered into a plurality of regions of higher and lower refractive index which alternate periodically. The periodic distance between the regions of higher refractive index is generally on the order of wavelengths of light and is known as the grating period, D. Typically, light enters the FBG from one end of the fiber and a selected wavelength of light is reflected backwards at the FBG at a wavelength that is related to the grating period D by the following:

$$\lambda_B = 2nD \qquad \text{Eq. (1)}$$

where $\lambda_B$ is the wavelength of the reflected light and is known as the Bragg wavelength, n is the refractive index of the optical fiber, and D is the grating period. The FBG is transparent at other wavelengths of light, for all intents and purposes.

As seen with respect to Eq. (1), when D increases, the Bragg wavelength increases. Similarly when D decreases, the Bragg wavelength decreases. Typically, D increases or decrease due to a strain on the FBG. Because of this, an FBG is often attached to an object so that the strains on the object transfer to the FBG to affect the grating period D to thereby produce a wavelength shift that is indicative of the strain. The wavelength shift is then measured. In addition to strain effects, the spacing D in a FBG may also be affected by thermal effects and changes in temperature which may cause expansion or contraction of the FBG. In high temperatures experienced downhole, the thermal expansion causes the FBG to give an anomalous reading of strain. Therefore, in one embodiment temperature measurements obtained downhole are used to compensate for the effects of temperature on strain readings.

Returning to FIG. 1, a distributed temperature sensing (DTS) system is disposed on the tubular 102 to obtain temperature measurements for correcting strain measurements. The exemplary DTS system of FIG. 1 includes a DTS fiber optic cable 122 with optical instrumentation at the end of the DTS fiber optic cable 122. In one embodiment, a short laser pulse is injected into the DTS fiber optic cable 122 and Raman scattering resulting in a pair of Stokes and anti-Stokes peaks occurs while the laser pulse travels along the fiber. Typically, the anti-Stokes peak is responsive to a change in temperature while the Stokes peak is not. A relative intensity of the two peaks therefore gives a measurement indicative of temperature change. The laser pulse can be considered as a moving sensor dynamically transmitting back temperature information while travelling through the fiber. The location of this moving sensor is determined by the arrival time of the returning light pulse. Temperature measurements from DTS may be used to correct strain measurements at the FBGs for thermal effects.

A variety of noise sources, such as electronic noises from the instrument, non-linear laser tuning, vibration of the interrogation unit, temperature fluctuation, and other noises from deployment and well environments, show up in Real-Time Compaction Monitoring (RTCM) signals, such as are described in related application Ser. Nos. 12/960,140, 12/959,862, and 12/960,119, the contents of which are incorporated by reference herein in their entirety. In one embodiment, the present disclosure provides a filter to remove noise from the wavelength shift signals from the FBGs 106 of the fiber optic cable 104 and/or from the temperature signals of the DTS 124.

Figure 2:
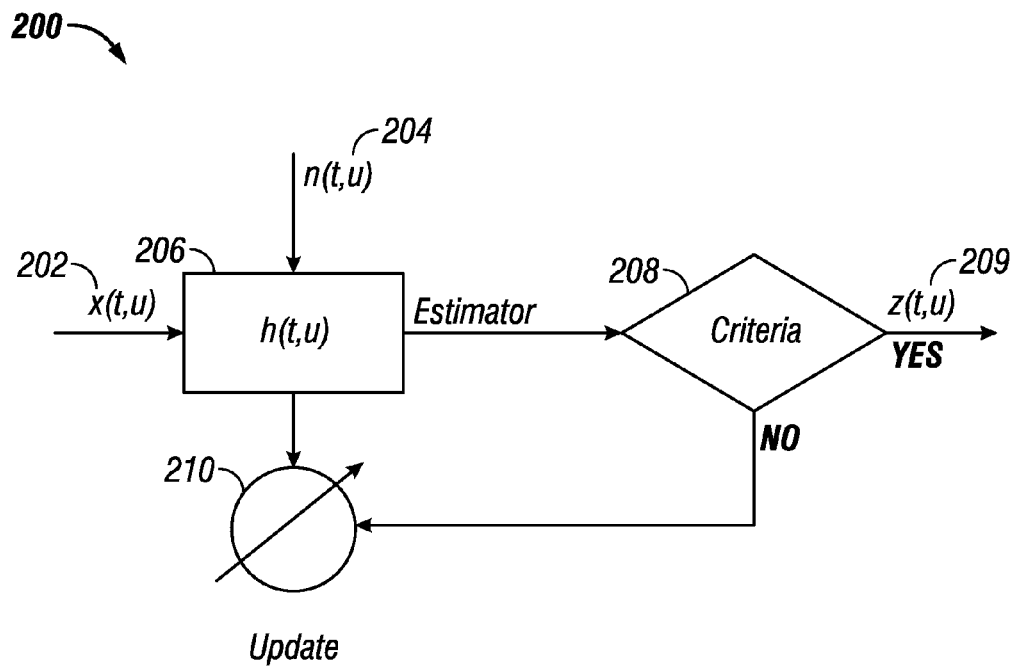
FIG. 2 illustrates an exemplary filtration system of the present disclosure for filtering a signal obtained from the exemplary system of FIG. 1.

FIG. 2 shows an exemplary filtration system 200 for filtering a signal obtained from a distributed sensing system such as RTCM and DTS data measurements. Signals x(t,u) 202 and z(t,u) 209 are respectively the input signal and the filtered output signal in two-dimensional space. Noise signal n(t,u) 204 indicates an unknown noise. Typically, the input signal and the noise are indistinguishable and thus are measured as one measurement. In addition, noise signal n(t,u) typically is not constant but changes with changes in environment. Therefore, both input x(t,u) and noise n(t,u) are typically dependent on two variables (t and u) which in one aspect refer to time (t) and a spatial coordinate (u) which may indicate sensor location. Although the exemplary methods of the present disclosure may be applied to the exemplary signal of the present disclosure, they may also be applied to any signal that is a continuous function measured in a two-dimensional measurement space.

In one embodiment, the exemplary filter is a self-adaptive filter using a dynamic window that may be adjusted to reduce noise in a signal. For a rapidly changing signal, the exemplary filter significantly removes noise over prior filters. In general, a criterion 208 is applied to determine an effectiveness of the applied filter. If the criteria is found acceptable, the filter is applied to the input signal x(t,u) and the noise n(t,u) to obtain a filtered output signal z(t,u) 209. Otherwise, a parameter 210 of the filter may be adjusted. In one aspect, the adjustable parameter is a size of a measurement subspace as indicated by a step size of window, such as exemplary window 304 of FIG. 3.

In one embodiment, the exemplary filtration system 200 may be applied to a signal that depend on both time and depth (spatial) coordinates, such as RTCM signals or DTS signals for example. In the time domain, the filtration typically is used to reduce noise due to vibrations and temperature fluctuations, etc. In the depth domain, the filtration is typically used to reduce noise from deformation mode frequencies that are higher than that of the rectangularization deformation mode.

Figure 3:
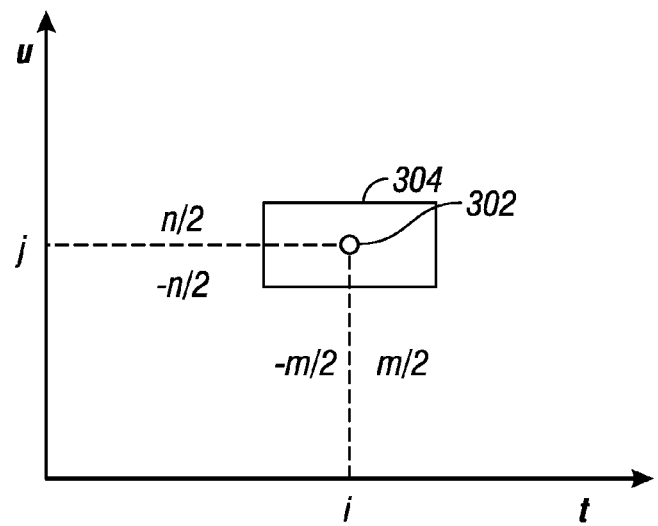
FIG. 3 shows an exemplary window used in filtering methods of the present disclosure.

FIG. 3 shows an exemplary data boundary of a localized two-dimensional subspace of the measurement space used in filtering an exemplary input signal x(t,u) using the exemplary filtration method described herein. Signal point 302 is plotted as a function of the variables t and u, with the first variable t plotted along the x-axis and the second variable u plotted along the y-axis. As shown in FIG. 3, exemplary signal point 302 is located at (i,j). In one aspect, a window 304 is drawn around and centered at the exemplary signal point 302 to select the subspace, the parameters of the window being used to define parameters of a filter of the signal. The window has parameters of a selected length (m) and height (n) referred to herein as step sizes and extends from i−m/2 to i+m/2 along the time axis and from j−n/2 to j+n/2 along the spatial axis. To create a symmetric window around the signal point, the step sizes (m and n) of the filtration system are selected to be an odd number. The step size of the window 304 affects a finite impulse response of a filter defined over measurement subspace.

The predictive model of the filter can be derived in terms of a Taylor series expansion in the vicinity of a particular point $(t_i, u_j)$ such as signal point 302, as shown in Eq. (3):

$$x(t, u) = x(t_i, u) + \frac{\partial x}{\partial t} x(t_i, u_j) \Delta t + \frac{\partial x}{\partial t} x(t_i, u_j) \Delta u + \frac{\partial^2 x}{2 \partial t^2} x(t_i, u_j) \Delta t^2 + \frac{\partial^2 x}{2 \partial u^2} x(t_i, u_j) \Delta u^2 + \frac{\partial^2 x}{2 \partial t \partial u} x(t_i, u_j) \Delta t \Delta u + \ldots$$

Eq. 3

Neglecting terms of order higher than second order, Eq. (3) may be rewritten using vectors, as shown in Eq. (4):

$$x(t, u) = \vec{a} \cdot \vec{x}^T$$

Eq. (4)

with $$\vec{x} = \left( x(t_i, u_j), \frac{\partial x}{\partial j} x(t_i, u_j), \frac{\partial x}{\partial t} x(t_i, u_j), \frac{\partial^2 x}{2 \partial t^2} x(t_i, u_j), \frac{\partial^2 x}{2 \partial u^2} x(t_i, u_j), \frac{\partial^2 x}{2 \partial t \partial u} x(t_i, u_j) \right)$$

Eq. (5)

and $$\vec{a} = (1, \Delta t, \Delta u, \Delta t^2/2, \Delta u^2/2, \Delta t \Delta u/2)$$

Eq. (6)

and where $\vec{x}^T$ is the transpose of $\vec{x}$. Vector $\vec{a}$ is related to window size and thus is affected by the selection of the window size. For simplicity, the notation $x_{i,j} \equiv x(t_i, u_j)$ and $$\left( \frac{\partial x}{\partial j} \right)_{i,j} \equiv \frac{\partial x}{\partial t}(t_i, u_j)$$

and so on is used for the remaining terms in Eq. (3) as well as for equations found hereinafter.

Eq. (4) may be used to obtain an equation correlating measurement data to predicted data:

$$A \vec{x}^T = \vec{y}^T + \vec{\epsilon}^T$$

Eq. (7)

where vector $\vec{y}$ is a one-dimensional vector, each element of which includes a signal corresponding to a measurement point in $\vec{x}^T$. Vector $\vec{y}$ may be expressed as:

$$\vec{y} = (y_{i-m/2,j-n/2}, y_{i-m/2,j-n/2} \ldots, y_{i,j}, \ldots, y_{i+m/2,j+n/2-1}, i_{i+m/2,j+n/2})$$

Eq. (8)

Vector $\vec{\epsilon}$ is a noise vector similarly expressed in a one-dimensional as $$\vec{\epsilon} = (n_{i-m/2,j-n/2}, n_{i-m/2+1,j-n/2} \ldots, n_{i,j}, \ldots, n_{i+m/2,j+n/2-1}, n_{i+m/2,j+n/2})$$

Eq. (9)

Matrix A is defined as $$A = (\vec{a}_0^T, \vec{a}_1^T, \vec{a}_2^T, \vec{a}_3, \ldots, \vec{a}_N^T)^T$$

Eq. (10)

where N=m×n is the total number of points contained within subspace window 304.

In the matrix equation of Eq. (7), both $\vec{x}$ and $\vec{\epsilon}$ are unknown vectors. The exemplary method of filtration may thus be restated as a method of minimizing the scalar value of $\vec{\epsilon}^T \cdot \vec{\epsilon}^T$. A least squares regression solution to the filtration may be written as $$\vec{x}^T = B \vec{y}^T$$

Eq. (11)

where $$B = (A^T A)^{-1} A^T$$

Eq. (12)

A finite impulse response of the filter is given by a response to a Kronecker delta input. The exemplary finite impulse response $\vec{h}$ 206 of the filtration system is then calculated as $$\vec{h} = (B_{01}, B_{02}, B_{03}, \ldots, B_{0N})$$

Eq. (13)

The resulting matrix B provides the impulse response for calculating the first and second partial derivatives, as shown in Eqs. (14).

$$\vec{h}\left(\frac{\partial x}{\partial t}\right) = (B_{11}, B_{12}, B_{13}, \ldots, B_{1N})$$

$$\vec{h}\left(\frac{\partial x}{\partial u}\right) = (B_{21}, B_{22}, B_{23}, \ldots, B_{2N})$$

$$\vec{h}\left(\frac{\partial^2 x}{\partial t^2}\right) = (B_{31}, B_{32}, B_{33}, \ldots, B_{3N})$$

$$\vec{h}\left(\frac{\partial^2 x}{\partial u^2}\right) = (B_{41}, B_{42}, B_{43}, \ldots, B_{4N})$$

$$\vec{h}\left(\frac{\partial^2 x}{\partial t \partial u}\right) = (B_{51}, B_{52}, B_{53}, \ldots, B_{5N})$$

Eqs. (14)

Step size of the subspace may be selected to reduce the value of a noise signal. An iterative method using step size as a variable minimizes an error of the filter. In one aspect, the filter may also provide information on changes that may occur in short time or distance, such as in the exemplary distributed sensing system used downhole as a monitoring system. An exemplary error function of the finite impulse response $\vec{h}$ may be written as $$\sigma_{i,j} = \sigma^I + \sigma_{i,j}^S$$

Eq. (15)

The first term $\sigma^I$ of Eq. (15) is the standard deviation for a filtered signal that originates from the inherent error of the sensing system and is given by $$\sigma^I = \sqrt{\sum_{k=0}^{N} B_{0k}^2 \sigma}$$

Eq. (16)

where σ is the standard deviation of the individual measurement signal. The second term $\sigma_{i,j}^S$ of Eq. (15) is a systematical error introduced by the selected filtration method and is given as:

$$\sigma_{i,j}^S = \left(\sum_{k=0}^{N}(k-N/2)^2\right) \times \left[\left|\left(\frac{\partial^2 x}{\partial t^2}\right)_{i,j}\right| + \left|\left(\frac{\partial^2 x}{\partial u^2}\right)_{i,j}\right| + \left|\left(\frac{\partial^2 x}{\partial t \partial u}\right)_{i,j}\right|\right] + \quad \text{Eq. (17)}$$

$$\sqrt{\sum_{k=0}^{N}(k-N/2)^2 B_{0k}^2} \sqrt{\sum_{k=0}^{N}\sum_{i=1}^{2} B_{ik}^2 \sigma} +$$

$$\sqrt{\sum_{k=0}^{N}(k-N/2)^4 B_{0k}^2} \sqrt{\sum_{k=0}^{N}\sum_{i=3}^{5} B_{ik}^2 \sigma} + \ldots$$

Both inherent and systematical error terms are dependent on step size. The inherent error term decreases with an increase in the selected step size. The systematical error term increases with an increase in selected step size. The step size of the filter can be adjusted with respect to the total error (Eq. 15) as an objective function in the iteration process.

Figure 4:
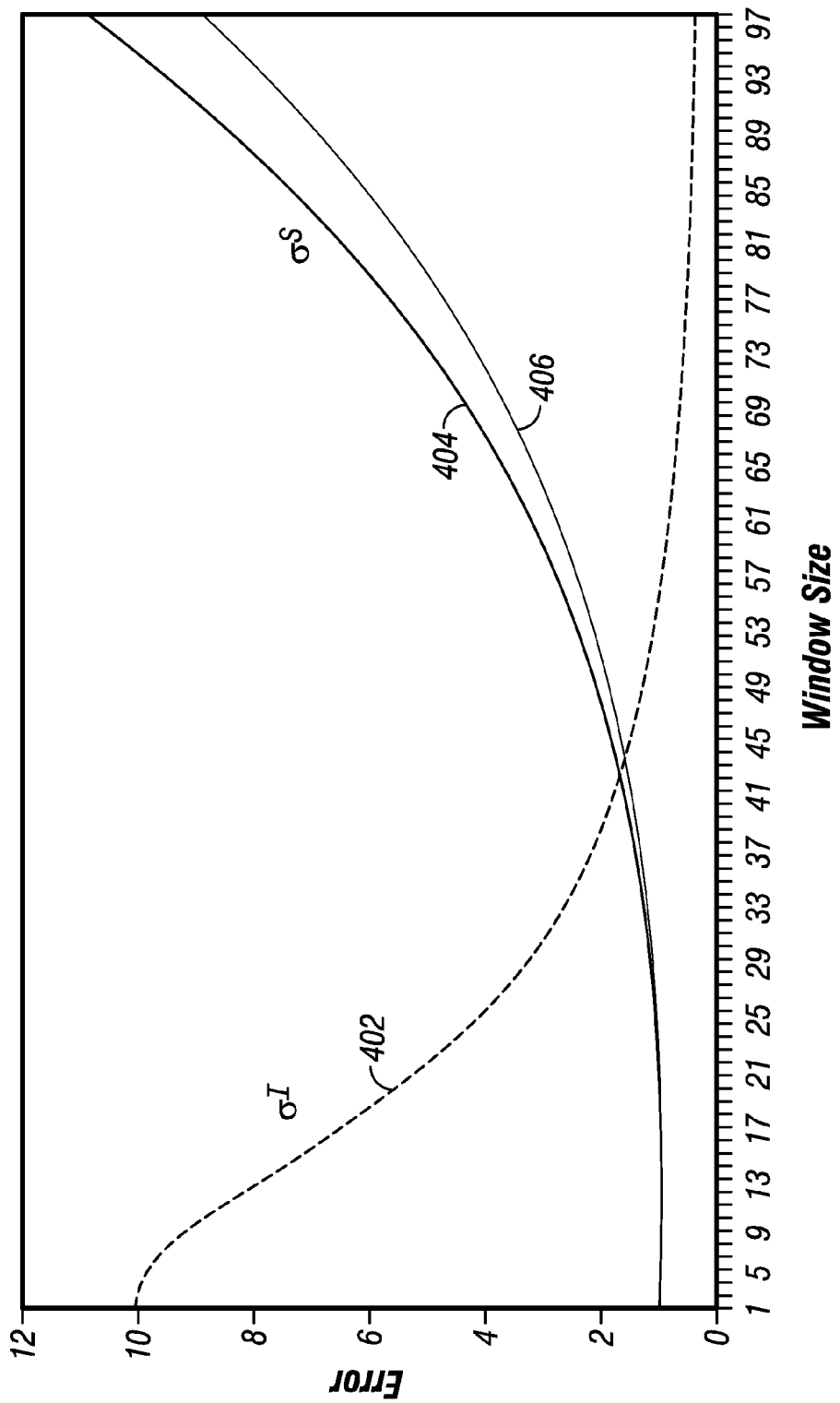
FIG. 4 shows a graph of error of a filtration method with respect to a size of the window selected for the exemplary data boundary of FIG. 3.

FIG. 4 shows an illustrative graph of exemplary error terms obtained using the exemplary methods of the disclosure. The error terms (y-axis) are plotted against step size (x-axis). The error of first curve 402 (error term $\sigma^I$) is significant for small step size and decreases as the step size N increases. Error term $\sigma^S_{i,j}$, the systematical error from the filter, is a function of step size in both time and spatial dimensions. Therefore two error curves 404 and 406 are shown, each representing the error function with one of the variables held constant. Curves 404 and 406 of error term $\sigma^S_{i,j}$ are small for small step sizes but increase with increasing step size. In one embodiment, an iteration process starts with a preselected step size that reduces noise from a steady signal. An error function is determined at the selected step size. If filtration at this step size provides a signal having a filtration error that is greater than a selected criterion, a second step size is selected and a second iteration is performed using the second step size. A second error function is determined at the second step size and the process may be repeated unit the filtration error is less than or equal to the selected criterion.

Figure 5:
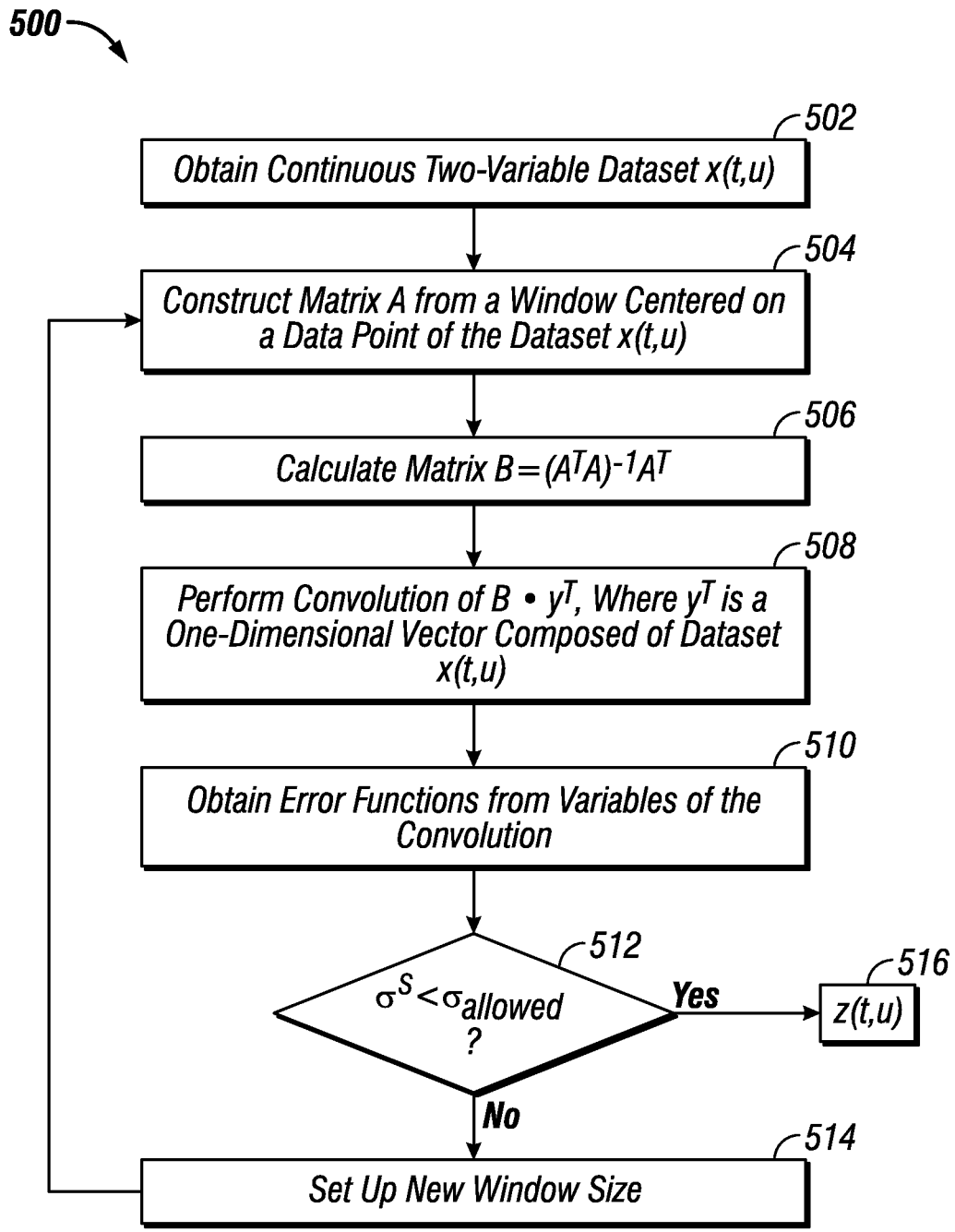
FIG. 5 shows an exemplary flowchart illustrating signal filtration using the exemplary methods of the present disclosure.

FIG. 5 shows a flowchart 500 of an exemplary filtration method of the present disclosure for reducing noise in a signal obtained from distributed sensing system. In Box 502, the original signal and noise are obtained from a distributed sensing system such as RTCM data or DTS. In one aspect, the signal is continuous over a two-dimensional space and is continuously differentiable to the second order. In general, the input signal and noise signal obtained in the same measurement are indistinguishable from each other. In Box 504, matrix A is constructed. Matrix A is shown in Eq. (9) and is dependent upon a size of a first window selected with respect to a data point of the signal as shown for example in FIG. 3. In Box 506, matrix B is calculated from matrix A using the exemplary methods of Eq. (12). In Box 508, matrix B is used in a convolution with $y^T$ variables. Error terms $\sigma^I$ and $\sigma^S_{i,j}$ are determined from the convolution. In Box 510, an error composed of terms $\sigma^I$ and $\sigma^S_{i,j}$ is created and in Box 512 the created error is compared to a selected error criterion ($\sigma_{allowed}$). If the composed error function is less than the selected criterion, the finite impulse response is applied to the input signal and noise to obtain filtered output signal z(t,u) (Box 516). Otherwise, in Box 514 a new (second) window is selected with a second window size and the process is repeated from Box 504 by obtaining a new matrix A.

Figure 6A:
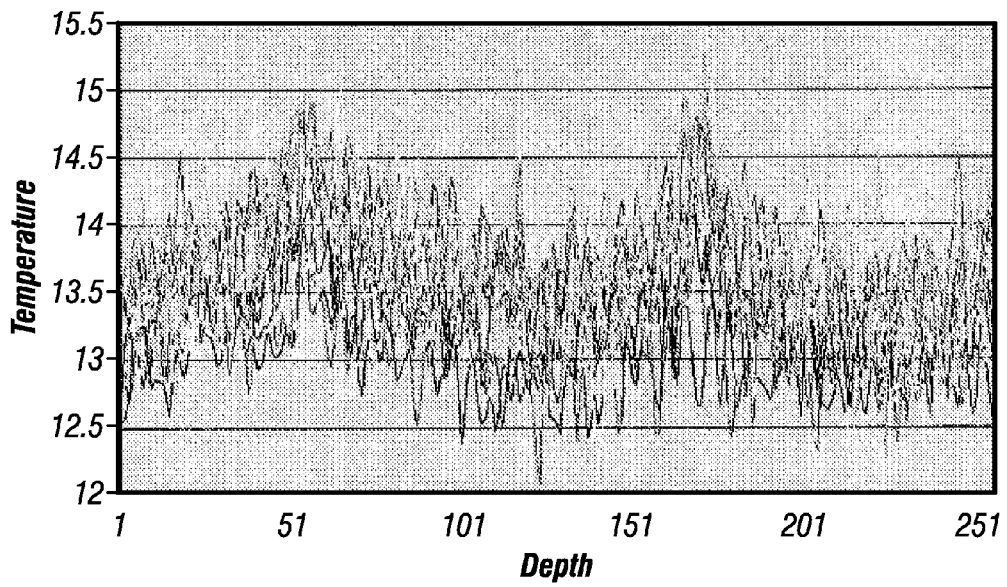
FIG. 6A shows an exemplary signal of two variables having a noise signal.
Figure 6B:
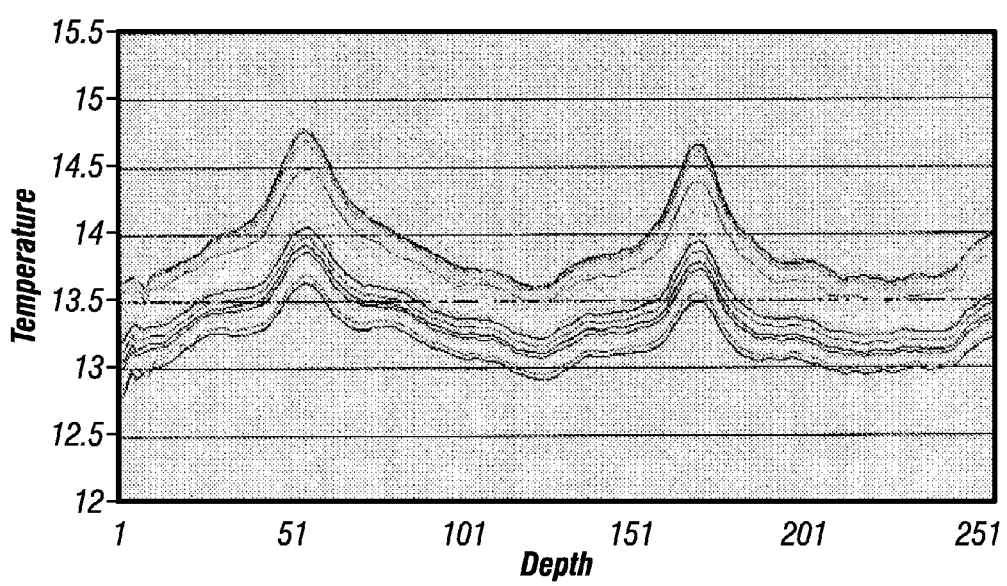
FIG. 6B shows the exemplary signal of FIG. 6A after application of the exemplary signal filtration system of the present disclosure.

FIGS. 6A and 6B show the effects of an exemplary filtration of the present disclosure applied to a signal that is a continuous function of two variables. In the particular embodiment of FIGS. 6A and 6B, the signal is obtained from DTS. Temperature is shown along the y-axis and sensor location number (indicative of a depth) is shown along the x-axis. DTS measurements depend on time and space as its two variables. Since the space variable is plotted along the x-axis, the time variable is indicated by the various curves of FIG. 6A. The noise associated with the original DTS data prevents obtaining useful information on how temperature data changes with time and depth. As seen in FIG. 6B, after filtering clear information for temperature change with time and depth is revealed in the curves obtained using the exemplary filtration of the present disclosure.

Figure 7:
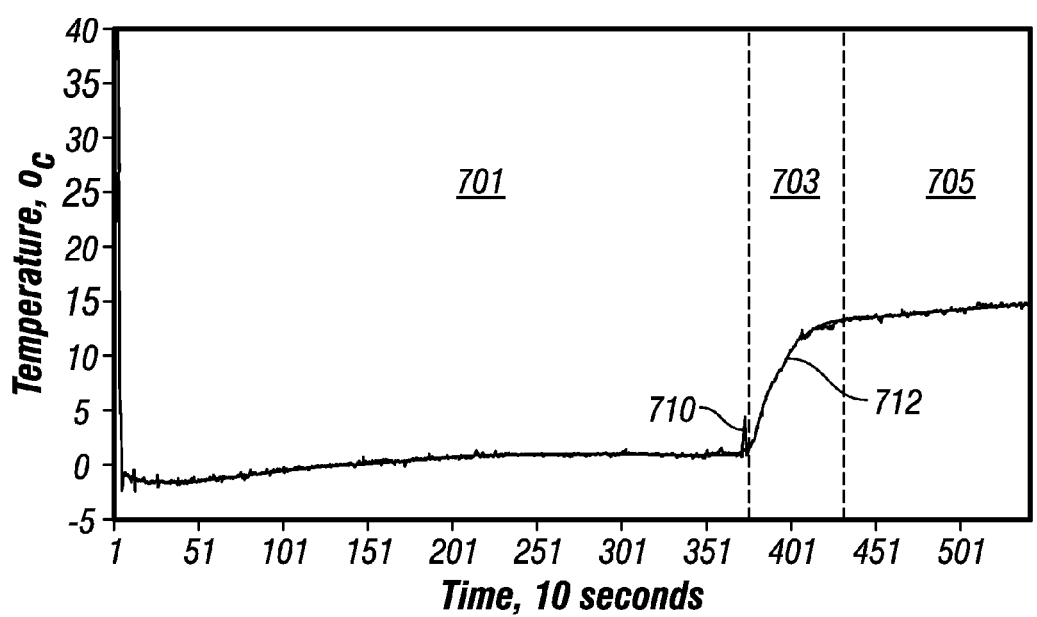
FIG. 7 shows a noisy signal and a related filtered signal over a range of a parameter affecting the signal.

FIG. 7 shows an exemplary original DTS curve 710 and a filtered output signal 712 obtained using the exemplary filtering system disclosed herein. The DTS curve is a plot of temperature vs. time. The curve has two regions of relative temperature stability approximately between time 1 and time 370 (region 701) and between time 425 and 550 (region 705). In the region from approximately time 371 to time 424 (region 703), the temperature changes quickly. In a typical application of the exemplary filter, a large step size is typically used for the signal in the regions 701 and 705. However, due to the quick-changing nature of the signal in region 703, a small step size is used for the filtering process in this region. The filtered signal 712 shows a good agreement with the original signal, especially in the region 703 where the filter produces a filtered signal that does not lag the original signal, as typically occurs in methods using a fixed window.

Therefore, in one aspect, the present disclosure provides method of filtering a signal from a plurality of distributed sensors, the method including: obtaining the signal from the plurality of distributed strain sensors; selecting a first subspace of a measurement space of the obtained signal, the first subspace characterized by a step having a selected step size; estimating an error for a filter corresponding to the first subspace; adjusting the step size when the estimated error meets a selected criterion; selecting a second subspace characterized by a step having the adjusted step size; and filtering the signal by applying a filter corresponding to the second subspace. The obtained signal may be a function of first and second variables. In one embodiment, the first variable is a time variable and the second variable is a space variable. The filter is generally defined over a two-dimensional measurement space selected using a filtration window having the selected step size. The estimated error in one embodiment is a sum of an inherent error of a system providing the signal and a systematical error of the filter defined over the first subspace. The inherent error may be related to a set of parameters of an impulse response and a sensor precision. The systematical error may be related to a set of parameters of an impulse response, a sensor precision and a second-order derivative of the signal. The method further includes storing a set of impulse responses parameters related to a step size in a database. Exemplary signals include: i) a signal of a distributed strain at a member, ii) a signal of a temperature distribution at a member, and iii) a distributed sensing signal. The step size is adjusted when the estimated error is greater than or equal to the selected criterion.

In another aspect, the present disclosure provides an apparatus for filtering a signal obtained at a member, the apparatus including: a plurality of sensors distributed on the member configured to obtain the signal from the member; and a processor configured to: obtain the signal from the plurality of distributed strain sensors; select a first subspace of a measurement space of the obtained signal, the first subspace characterized by step having a selected step size; estimate an error for a filter corresponding to the first subspace; adjust the step size when the estimated error meets a selected criterion; select a second subspace characterized by a step having the adjusted step size; and filter the signal by applying a filter corresponding to the second subspace. The obtained signal may be a function of first and second variables and the first variable may include a time variable and the second variable may include a space variable. The processor may further define the filter over a two-dimensional measurements space by selecting a filtration window having the selected step size. The estimated error is a sum of an inherent error of a system providing the signal and a systematical error of the filter defined over the first subspace. The inherent error may be related to a set of parameters of an impulse response, a sensor precision and a filtration step size. The systematical error may be related to a set of parameters of an impulse response, a sensor precision and a second-order derivative of the signal. A database may store a set of impulse response parameters related to a step size. In various embodiments, the signal is one of: i) a signal of a distributed strain at a member, ii) a signal of a temperature distribution at a member, and iii) a distributed sensing signal. The processor may be further configured to adjust the step size when the estimated error is greater than or equal to the selected criterion.

In yet another aspect, the present disclosure provides a computer readable medium having stored thereon instructions that when read by a processor enable the processor to perform a method, the method comprising: obtaining the signal from the plurality of distributed strain sensors; selecting a first subspace of a measurement space of the obtained signal, the first subspace characterized by a step having a selected step size; estimating an error for a filter corresponding to the first subspace; adjusting the step size when the estimated error meets a selected criterion; selecting a second subspace characterized by a step having the adjusted step size; and filtering the signal by applying a filter corresponding to the second subspace.

While the foregoing disclosure is directed to the preferred embodiments of the disclosure, various modifications will be apparent to those skilled in the art. It is intended that all variations within the scope and spirit of the appended claims be embraced by the foregoing disclosure.

What is claimed is:

1. A method of determining a strain at a member in a borehole, comprising:
    sending a pulse of light along a fiber optic cable extending along the member;
    receiving a signal in response to the pulse of light related to a temperature at a distance along the fiber optic cable; and
    using a processor to:
    select a first subspace of a measurement space of the received signal, the first subspace characterized by a step having a selected step size;
    estimate an error for a filter corresponding to the first subspace;
    adjust the step size when the estimated error meets a selected criterion;
    select a second subspace characterized by a step having the adjusted step size;
    apply the filter corresponding to the second subspace to the received signal to obtain a filtered temperature signal; and
    apply the filtered temperature signal to a strain measurement obtained at the member to obtain a temperature-corrected strain measurement at the member.

2. The method of claim 1 wherein, the received signal is a function of first and second variables.

3. The method of claim 2, wherein the first variable is a time variable and the second variable is a space variable.

4. The method of claim 1, wherein the filter is defined over a two-dimensional measurement space selected using a filtration window having the selected step size.

5. The method of claim 1 wherein, the estimated error is a sum of an inherent error of a system providing the signal and a systematical error of the filter defined over the first subspace.

6. The method of claim 5, wherein the inherent error is related to a set of parameters of an impulse response and a sensor precision.

7. The method of claim 5, wherein the systematical error is related to a set of parameters of an impulse response, a sensor precision and a second-order derivative of the received signal.

8. The method of claim 1, further comprising storing a set of impulse response parameters related to a step size in a database.

9. The method of claim 1, wherein the received signal is one of: i) a signal of a distributed strain at a member, ii) a signal of a temperature distribution at a member, and iii) a distributed sensing signal.

10. The method of claim 1, wherein the step size is adjusted when the estimated error is greater than or equal to the selected criterion.

11. An apparatus for determining a strain at a member in a borehole, comprising:
    a fiber optic cable extending along the member;
    an interrogation unit configured to send a pulse of light along the fiber optic cable and receive a signal in response to the pulse of light related to a temperature at a distance along the fiber optic cable; and
    a processor configured to:
    select a first subspace of a measurement space of the received signal, the first subspace characterized by a step having a selected step size;
    estimate an error for a filter corresponding to the first subspace;
    adjust the step size when the estimated error meets a selected criterion;
    select a second subspace characterized by a step having the adjusted step size;
    apply a filter corresponding to the second subspace to the received signal to obtain a filtered signal of the temperature; and
    apply the filtered temperature signal to a strain measurement obtained at the member to obtain a temperature-corrected strain measurement at the member.

12. The apparatus of claim 11, wherein the received signal is a function of first and second variables.

13. The apparatus of claim 12, wherein the first variable is a time variable and the second variable is a space variable.

14. The apparatus of claim 11, wherein the processor is further configured to define the filter over a two-dimensional measurement space by selecting a filtration window having the selected step size.

15. The apparatus of claim 11, wherein the estimated error is a sum of an inherent error of a system providing the signal and a systematical error of the filter defined over the first subspace.

16. The apparatus of claim 15, wherein the inherent error is related to a set of parameters of an impulse response, a sensor precision and a filtration step size.

17. The apparatus of claim 15, wherein the systematical error is related to a set of parameters of an impulse response, a sensor precision and a second-order derivative of the received signal.

18. The apparatus of claim 11, further comprising a database configured to store a set of impulse response parameters related to a step size.

19. The apparatus of claim 11, wherein the received signal is one of: i) a signal of a distributed strain at a member, ii) a signal of a temperature distribution at a member, and iii) a distributed sensing signal.

20. The apparatus of claim 11, wherein the processor is configured to adjust the step size when the estimated error is greater than or equal to the selected criterion.

21. A non-transitory computer readable medium containing computer instructions stored therein for causing a computer processor to perform a method of determining a strain at a member in a borehole, the method comprising:
  receiving the signal from a fiber optic cable coupled to a member in response to a pulse of light sent along the fiber optic cable;
  selecting a first subspace of a measurement space of the received signal, the first subspace characterized by a step having a selected step size;
  estimating an error for a filter corresponding to the first subspace;
  adjusting the step size when the estimated error meets a selected criterion;
  selecting a second subspace characterized by a step having the adjusted step size;
  applying a filter corresponding to the second subspace to the received signal to obtain a filtered temperature signal; and
  applying the filtered temperature signal to a strain measurement obtained at the member to obtain a temperature-corrected strain measurement at the member.

* * * * *